July 27, 1937.  R. BORDE  2,088,185
FLUID PRESSURE BRAKE
Filed March 3, 1936  4 Sheets-Sheet 2

INVENTOR
RAOUL BORDE
BY Wm. M. Cady
ATTORNEY

Fig. 7

Patented July 27, 1937

2,088,185

UNITED STATES PATENT OFFICE 2,088,185

FLUID PRESSURE BRAKE

Raoul Borde, Paris, France, assignor to The Westinghouse Air Brake Company, Wilmerding, Pa., a corporation of Pennsylvania Application March 3, 1936, Serial No. 66,855
In France July 11, 1935

20 Claims. (Cl. 303—21)

This invention relates to fluid pressure brake equipment and the principal object of the invention is to provide an improved fluid pressure brake equipment in which the degree of application of brakes obtained by operation of suitable means under the control of an operator is adapted to be modified in accordance with variable conditions of operation such as the speed of the vehicle and/or the load carried by the vehicle.

Other objects and advantages will be apparent from the following more detailed description of the invention.

In the accompanying drawings.

Figure 1:
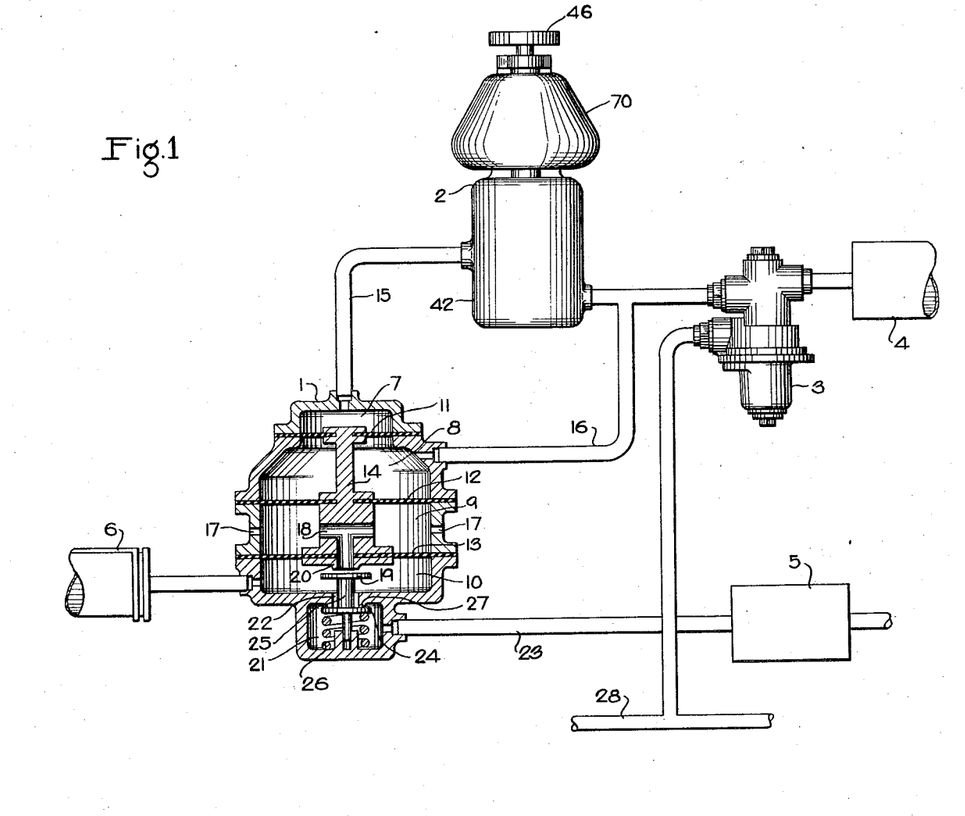
Fig. 1 is a diagrammatic view, partly in section, of a fluid pressure brake equipment embodying one form of the invention.

As shown in Fig. 1 of the drawings, the fluid pressure brake equipment comprises a brake cylinder pressure control valve device 1, a speed controlled brake cylinder pressure modifying valve device 2, a manually controlled device such as a triple valve device 3, an auxiliary reservoir 4, a source of fluid under pressure which is independent of the auxiliary reservoir 4, such as a main reservoir 5, and a brake cylinder 6.

The brake cylinder pressure control device 1 comprises a casing divided into four chambers 7, 8, 9 and 10 by means of three spaced movable abutments preferably in the form of flexible diaphragms 11, 12 and 13 which are operatively connected to each other by a stem 14 suitably secured to said diaphragms. These diaphragms may all be of different effective areas for reasons which will be hereinafter described.

The upper chamber 7 is connected to a pipe 15 which leads to the modifying valve device 2. The chamber 8 is connected to a pipe 16 which leads to the brake cylinder connection of the triple valve device 3. The chamber 9 is open to the atmosphere through a plurality of ports 17 in the casing, and is also open to a passage 18 provided in the stem 14 and leading to chamber 10 which is connected to the brake cylinder 6.

A brake cylinder release valve 19 is disposed in chamber 10 and is adapted to engage a seat rib 20, provided on the stem 14 around the opening of passage 18 to chamber 10, to close communication from said chamber to said passage.

The casing is provided with a chamber 21 which is connected by a passage 22 to chamber 10 and by a pipe 23 to the reservoir 5. A brake cylinder supply valve 24 is disposed in chamber 21 and is provided with a stem 25 which loosely extends through the passage 22 and engages the release valve 19 in chamber 10. A spring 26 in chamber 21 acts on the valve 24 urging said valve into engagement with a seat rib 27 provided around the passage 22.

The manually controlled valve device which may be in the form of the triple valve device 3 is connected to a brake pipe 28 and is adapted to operate in the usual well known manner upon a reduction in brake pipe pressure to supply fluid under pressure from the auxiliary reservoir 4 to pipe 16 and from thence to chamber 8 in the brake cylinder pressure control device 1 and to the brake cylinder pressure modifying valve device 2, and upon an increase in brake pipe pressure to vent fluid under pressure from pipe 16 and consequently from these devices.

Figure 2:
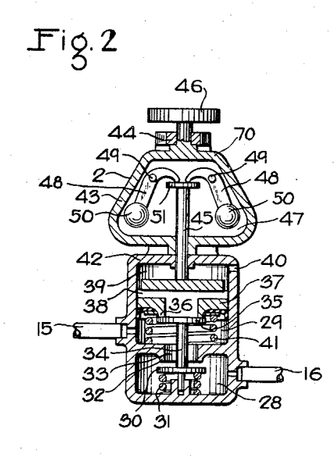
Fig. 2 is a sectional, diagrammatic view of a modifying valve device shown in Fig. 1.

The speed controlled modifying valve device 2, shown in Figs. 1 and 2 of the drawings, comprises a valve portion 42 and a speed governor portion 70. The valve portion comprises a casing having a chamber 28 in communication with pipe 16 and a chamber 29 in communication with pipe 15. A supply valve 30 is disposed in chamber 28 and a spring 31 in said chamber acts on the supply valve for urging same into engagement with a seat rib 32 provided around a passage 33 connecting chamber 28 to chamber 29. The supply valve 30 is provided with a stem 34 which extends through passage 33 and carries a release valve 35 in chamber 29. This release valve is adapted to seat against a seat rib 36 provided on one face of a movable abutment 37 provided in the casing for controlling communication from chamber 29 to a vent passage 38 in said abutment. The passage 38 extends through the abutment 37 and is open to a chamber 39 which in turn is open to the atmosphere through a passage 40. A bias spring 41 is provided in chamber 29 and acts on the movable abutment 37 urging same in the direction for permitting spring 31 to seat the supply valve 30 and for moving said abutment out of seating engagement with the release valve 35.

According to the embodiment of the invention shown in Figs. 1 and 2 of the drawings the speed governor portion 70 is provided for applying to the movable abutment 37 a pressure which varies with vehicle speed for urging said abutment in a direction against the bias spring 41.

The speed governor portion 70 may be of any desired construction, but for the purpose of illustration may comprise a casing 43 adapted to rotate relative to the casing of the valve portion 42, one end of the casing 43 being carried in a bearing 44 which is provided in a bracket projecting from said valve casing. The other end of the casing 43 is rotatably carried by a thrust rod 45 which extends through the casing of the valve portion 42 with one end engaging the movable abutment 37. Outside of the bearing 44, any suitable driving means such as a pulley 46 is secured to the extended end of the casing 43 and is adapted to be driven by means, such as a belt (not shown) from any part of a vehicle which rotates in accordance with the speed at which the vehicle is traveling.

The governor casing is provided with a chamber 47 into which the thrust rod 45 extends. Two oppositely disposed arms 48 are disposed in chamber 47 and are pivotally mounted on pins 49 provided in the casing 43. Each of these arms is provided on one end with a mass or weight 50 while the other end is bent so as to engage a plate 51 provided on the end of the thrust rod 45. It will be evident that as the casing 43 and hence the governor arms 48 are rotated, the action of centrifugal force on weights 50 will act to swing said weights outwardly and thereby apply to the plate 51 and through the rod 45 to the movable abutment 37 a pressure which varies with the speed of the vehicle.

The operation of the equipment as so far described is as follows:

The equipment in Figs. 1 and 2 of the drawings is shown in the condition assumed when the vehicle is moving and the brake system fully charged with fluid under pressure and the brakes released.

With the triple valve device in release position the pipe 16 and therefore chamber 8 in the brake cylinder pressure control valve device 1 and chamber 28 in the brake cylinder pressure modifying valve device 2 are open to the atmosphere.

The action of the speed governor 70 on the movable abutment 37 positions said abutment so as to seat the release valve 35 and unseat the supply valve 30 against the opposing relatively light pressure of the biasing spring 41 and spring 31. With the supply valve 30 unseated, chamber 7 in the brake cylinder pressure control valve device 1 is open to the atmosphere by way of pipe 15, chambers 29 and 28 in the modifying valve device 2, pipe 16 and from thence through the triple valve device 3.

With chambers 7 and 8 in the brake cylinder pressure control valve device open to the atmosphere, spring 26 acts to press the brake cylinder supply valve 24 against the seat rib 27 so as to prevent flow of fluid under pressure from chamber 21 to chamber 10, while the diaphragms 11, 12 and 13 assume a normal condition of rest in which the seat rib 20 is moved out of engagement with the release valve 19, thereby venting the brake cylinder 6 to the atmosphere by way of chamber 10, passage 18, chamber 9 and ports 17.

If it is desired to effect an application of the brakes a reduction in pressure is effected in the brake pipe 28 which causes the triple valve device 3 to operate in the usual well known manner to supply fluid under pressure from the auxiliary reservoir 4 to pipe 16 through which it flows directly to the brake cylinder pressure control valve device and also to chamber 28 in the modifying valve device. With the vehicle under motion and the governor controlled valve 35 seated and unseating the valve 30 fluid under pressure supplied to chamber 28 flows past the valve 30 to chamber 29 and from thence through pipe 15 to chamber 7 in the brake cylinder pressure control device 1.

Fluid under pressure supplied to chamber 29 acts on the movable abutment 35 in opposition to the force applied by the governor 70 to said abutment. The governor 70 is so designed that when the vehicle is operating at a predetermined high speed, it will permit the full pressure obtainable in pipe 16 to act in the chamber 7 of the control valve device 1, but if the speed of the vehicle is less than said predetermined high speed, then when the pressure obtained in chamber 7 and acting in chamber 29 is built up to the proper degree for that speed, said pressure acting on the abutment 35 overcomes the opposing force of the governor and shifts said abutment upwardly which permits the valve 30 to seat and thus prevent further flow of fluid under pressure to said chambers. In other words the governor is designed to permit attainment in chamber 7 of the maximum pressure supplied by the triple valve device 3 when the speed of the vehicle is at a predetermined high value, but for all speeds less than said predetermined value, the governor operates to limit the pressure attainable in chamber 7 to a pressure which is proportional to the speed of the vehicle.

Fluid under pressure thus supplied to chambers 8 and 7 in the brake cylinder pressure control valve device 1 provides a downwardly acting pressure on the diaphragm assemblage within said device which is equal to the pressure in chamber 8 acting on the diaphragm 12 less the differential force of the pressures in chambers 8 and 7 acting on the diaphragm 11.

The downwardly acting force thus applied to the diaphragm assemblage within the brake cylinder pressure control device moves said assemblage downwardly which first seats the seat rib 20 against the release valve 19 and then acts through the stem 25 to unseat the supply valve 24 against the pressure of spring 26.

With the supply valve 24 unseated, fluid under pressure supplied from the reservoir 5 to chamber 21 flows to chamber 10 and from thence to the brake cylinder 6.

Fluid under pressure is thus supplied to the brake cylinder 6 until a pressure is obtained therein and in chamber 10 which overcomes the opposing control pressure on diaphragms 11 and 12 at which time the diaphragm assemblage is moved upwardly until the valve 24 engages the seat rib 27 to cut off further flow of fluid under pressure to the brake cylinder.

When the brakes are applied in the manner just described it will be evident that the degree of application depends not only upon the degree of pressure obtained in the pipe 16 and chamber 8 but also upon the pressure of fluid obtained in chamber 7 as determined by the speed of the vehicle.

If a full application of the brakes is effected at a time when the vehicle is traveling at the maximum speed limit for which the governor 70 is designed, then the pressure obtained in chamber 7 of the control valve device 1 will equal that obtained in chamber 8. The diaphragm 11 will thus be in equilibrium, and the pressure obtained in the brake cylinder 6 will be governed by the pressure in chamber 8 acting on the diaphragm 12. If at the time the brakes are applied the vehicle is traveling at a speed less than the maximum limit, then the governor operates to limit the pressure obtained in chamber 7 to a degree which is proportional to the speed but less than that obtained in chamber 8. This results in a differential force acting upwardly on the diaphragm 11 which partially counteracts the downwardly acting force applied to diaphragm 12 so that a lower brake cylinder pressure is required in chamber 10 to effect closing of the application valve 24. In other words, at speeds below the maximum speed limit, the speed controlled modifying valve device 2 acts to limit the pressure obtained in chamber 7 to a pressure which is proportional to the speed of the vehicle, and this results in varying the differential of pressures on the diaphragm 11 so as to limit the pressure obtainable in the brake cylinder to a degree depending upon the vehicle speed.

It will of course be understood that if only a light application of the brakes is effected, that is an application which provides a pressure in pipe 16 less than required to move the abutment 37 against the opposing force of the governor 70, the same pressure will be obtained in chamber 7 as in chamber 8, so that only the pressure acting downwardly on the diaphragm 12 will govern the pressure of fluid obtained in the brake cylinder.

As the speed of the vehicle reduces, after the brakes are applied, the force applied by the governor 70 to the movable abutment 35 also reduces correspondingly and when thus reduced sufficiently, the pressure of fluid in chamber 29 acting on the movable abutment 37 shifts said abutment upwardly out of seating engagement with the valve 35. With the valve 35 thus unseated, fluid under pressure is vented from chamber 29 and the connected diaphragm chamber 7 to the atmosphere through passage 38 in the abutment 37, chamber 39 and the atmospheric passage 40.

The valve 35 will be unseated, as just described, just sufficiently to permit the pressure of fluid in chambers 29 and 7 to reduce as the speed reduces, in other words, the operation of the governor will maintain the pressure in said chambers proportional to the speed, during the deceleration of the vehicle.

As the pressure in chamber 7 is thus reduced as the vehicle decelerates, the differential of pressures acting in an upwardly direction on the diaphragm 11 increases which results in a reduction in the force acting in a downwardly direction on the diaphragm assemblage within the control device 1. This reduction in the downwardly acting force permits brake cylinder pressure in diaphragm chamber 10 acting on diaphragm 13 to shift the diaphragm assemblage upwardly which unseats the release valve 19 and permits the pressure of fluid in chamber 10 and in the brake cylinder 6 to reduce by flow past the valve 19, through port 18 to chamber 9 and from thence through ports 17 to the atmosphere.

The release valve 19 may be unseated as just described only an amount sufficient to permit the pressure in chamber 10 to reduce according to the reduction in pressure in chamber 7 as effected by operation of the governor 70. It will thus be evident that since the governor 70 acts upon deceleration of the vehicle to reduce the pressure in chamber 7 according to the reduction in speed, the control device 1 acts to effect a corresponding reduction in pressure in the brake cylinder 6, so that the brake cylinder pressure is maintained at the correct relation to the vehicle speed.

It will be apparent that the diaphragms 11, 12 and 13 may be constructed to have any desired effective areas, that is, the effective areas of diaphragms 11 and 12 may be of such a ratio that fluid pressure acting on diaphragm 11 will provide any desired modification of the downwardly acting force obtained on the diaphragm assemblage by the pressure of fluid acting on diaphragm 12, while the effective area of the diaphragm 13 may be such relative to that of the diaphragms 11 and 12 that the brake cylinder pressure obtained in chamber 10 may bear any desired relation to the pressures in chambers 7 and 8.

It will be evident from the above description of operation that the control valve device 1 is what is commonly known as a self-lapping valve device in that it operates automatically according to variations in the control pressures in chambers 7 and 8 to effect a proportional variation in pressure in the chamber 10 by controlling the opening and closing of the valves 19 and 24. Likewise, it will be noted that the valve means 42, is also a self-lapping valve device since it acts to vary the pressure obtained in chamber 7 according to the pressure applied to the movable abutment 37 as by the operation of the governor 70.

Figures 3, 4, 5:
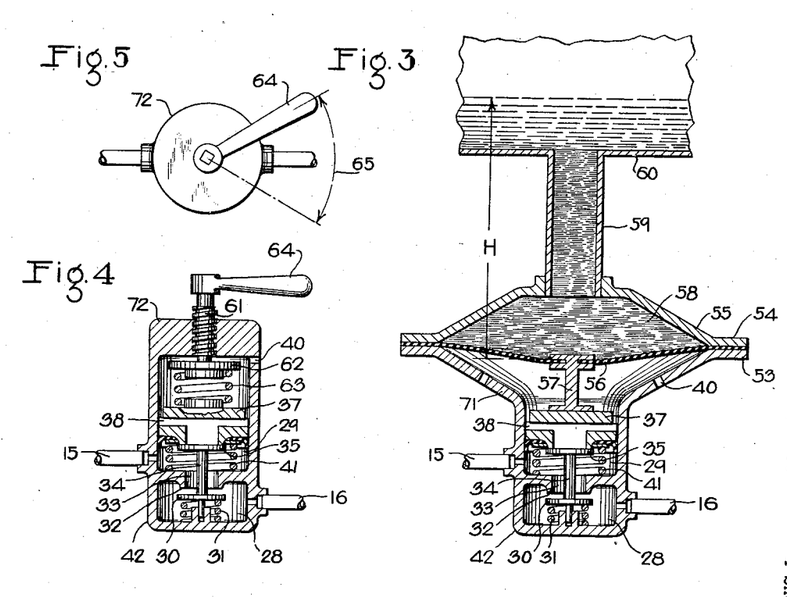
Fig. 3 is a sectional, diagrammatic view of another form of modifying valve device.
Fig. 4 is a sectional, diagrammatic view of still another form of modifying valve device.
Fig. 5 is a plan view of the device shown in Fig. 4.

In Fig. 3 of the drawings is shown a load controlled brake cylinder pressure modifying valve device 71 which may be employed in the fluid pressure brake equipment shown in Fig. 1 in place of the speed controlled modifying valve device 2.

The modifying valve device 71 comprises a valve portion 42 which is the same as that employed in the construction shown in Figs. 1 and 2 except that the upper end of the casing is flared outwardly to provide an annular clamping flange 53. Between this flange and a corresponding flange 54 provided on a cover 55 is clamped a flexible diaphragm 56. A thrust rod 57 is secured at one end to the diaphragm 56 while the other end engages the atmospheric face of the movable abutment 37.

A chamber 58 is formed within the cover 55 between said cover and the diaphragm 56 and communicates through a pipe 59, which is secured to said cover, with a tank 60 such as in the tender of a locomotive or of a liquid carrying vehicle. Through this communication the hydrostatic pressure of the head H of liquid above the diaphragm 56 in the tank acts on said diaphragm, and it will be evident that said pressure will vary according to the height of head H, or in other words according to the load carried by the vehicle.

The pressure of the liquid on the diaphragm 56 is applied through the stem 57 to the movable abutment 37, which is moved thereby to seat the release valve 35 and unseat the supply valve 30 when the vehicle is in motion and the brakes are released.

When an application of the brakes is effected, fluid under pressure supplied to pipe 16 flows to chamber 8 in the control valve device 1 and to chamber 28 in the modifying valve device 71. From chamber 28, fluid under pressure flows past the unseated valve 30 to chamber 29 and from thence to chamber 7 in the control valve device 1, and this flow continues until a pressure is obtained in chamber 29 on the abutment 35 which is sufficient to move said abutment upwardly against the opposing hydrostatic pressure acting on the diaphragm 56 and permit the supply valve 30 to seat. It will be evident that the pressure thus obtained in chambers 29 and 7 depends upon the height of the head H or in other words upon the liquid load carried by the vehicle.

The control valve 1 operates according to the pressure thus obtained in chamber 7 and to the pressure of fluid supplied to chamber 8 to provide a proportional pressure in brake cylinder 6 in the same manner as hereinbefore described, but since the pressure obtained in chamber 7 is determined by the operation of the load controlled modifying valve device 71, the pressure obtained in the brake cylinder 6 is in accordance with the load carried by the vehicle, as will be evident.

A manually adjustable modifying valve device 72 is shown in Figs. 4 and 5 of the drawings, which may be employed in the fluid pressure brake equipment shown in Fig. 1, in place of the modifying valve device 2. The modifying valve device 72 being manually adjustable permits the operator to vary an application of the brakes, as effected by operation of the control device 1, in accordance with the speed of the vehicle, the load carried by the vehicle, rail conditions or for any other desirable reason.

The modifying valve device 72 comprises a valve portion 42 which is the same as employed in the constructions hereinbefore described except that the casing is arranged to carry a screw 61 in axial alignment with and at the atmospheric side of the abutment 37. Inside of the casing a plate 62 is pressed against the inner end of the screw 61 by means of a spring 63 which is interposed between said plate and the atmospheric face of the movable abutment 37. Outside of the casing a handle 64 is secured to the screw 61 for turning same. The handle 64 may be adjusted to any position in a range of travel such as designated by the reference character 65. Such movement of the handle will either turn the screw 61 into or out of the casing. This will vary the position of the plate 62 relative to the abutment 37 and consequently vary the pressure of spring 63 on said abutment.

In operation, when an application of the brakes is effected, the pressure obtained in chamber 7 of the control valve device will obviously depend upon the pressure of the spring 63 which has to be overcome by the pressure of fluid in chamber 29 in order to permit seating of the supply valve 30 as described in connection with the constructions shown in Figs. 2 and 3 of the drawings. It will therefore be evident that by the proper positioning of the handle 64, the degree of pressure obtained in the brake cylinder 6 in effecting an application of the brakes may be modified as desired.

The equipment as so far described contemplates the use of a device controlled by vehicle speed, by vehicle load, or manually for providing a modifying control pressure in the brake cylinder pressure control valve device 1 for controlling the degree of an application of brakes. Under certain circumstances it might be desirable to modify the degree of an application of brakes effected upon a reduction in brake pipe pressure in accordance with more than one variable such as both speed and load, and to this end the equipments shown in Figs. 6 and 7 are provided.

Figure 6:
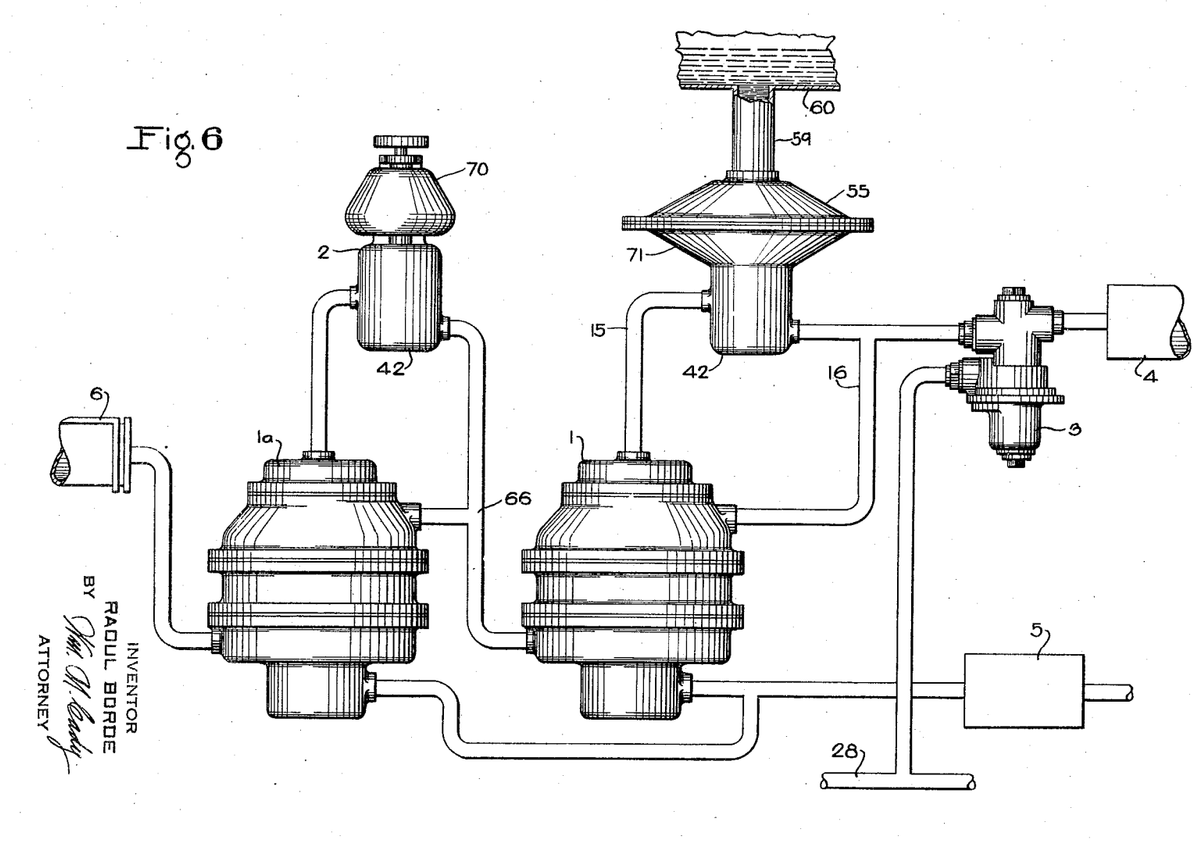
Fig. 6 is a diagrammatic view, with the parts shown mainly in outline, of a fluid pressure brake equipment embodying the modifying valve devices shown in Figs. 2 and 3 of the drawings.
Figure 7:
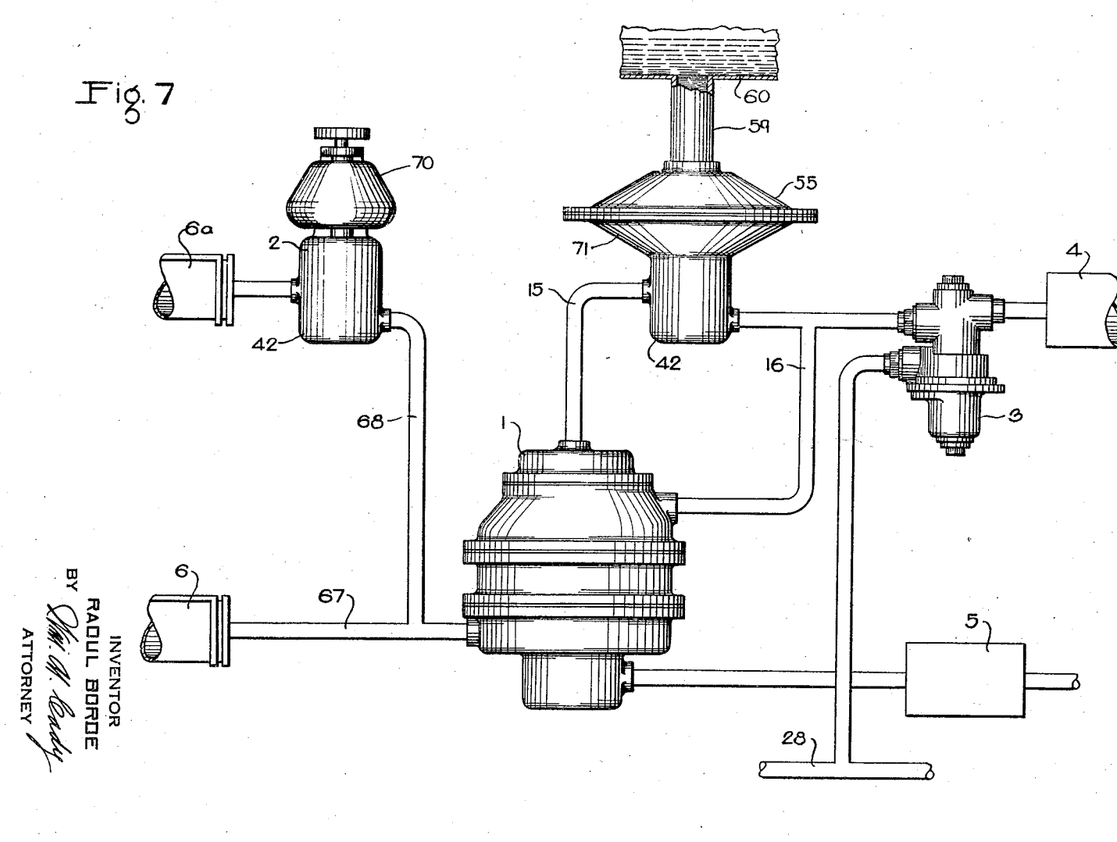
Fig. 7 is a diagrammatic view of a fluid pressure brake equipment showing another embodiment of the modifying valve devices shown in Figs. 2 and 3 of the drawings.

According to the construction shown in Fig. 6 of the drawings: two brake cylinder pressure controlling valve devices 1 and 1a are provided, both of these being identical to that shown in Fig. 1 of the drawings. The brake cylinder pressure controlling valve device 1 is connected to the triple valve device 3, the load controlled modifying valve device 71 and to the main reservoir 5 as hereinbefore described in connection with the modification shown in Fig. 3.

When an application of the brakes is effected with the equipment shown in Fig. 6 the triple valve device 3 and the modifying valve device 71 operate to supply fluid under pressure to chambers 8 and 7 of the control valve device 1, which then in turn operates to supply to pipe 66, instead of to brake cylinder 6 as in the previously described constructions, fluid at a pressure which depends upon the reduction in brake pipe pressure and the load on the vehicle.

The fluid under pressure obtained in pipe 66 flows to chamber 8 in the brake cylinder pressure control valve device 1a and to chamber 28 in the speed controlled modifying valve device 2. Fluid under pressure supplied to chamber 28 flows to chamber 29 and from thence to chamber 7 in the brake cylinder pressure control valve device 1a until the pressure in chamber 7 is built up to correspond to the speed of the vehicle. The brake cylinder pressure control device 1a is thus subject in chamber 8 to the pressure in pipe 66 which is modified according to vehicle load and in chamber 7 to pressure modified according to vehicle speed, and these two pressures control the operation of the control device 1a, which then operates, in the same manner as the control device 1, to provide in the brake cylinder 6 a pressure which is governed by the reduction in brake pipe pressure, the load on the vehicle and the speed of the vehicle.

After the brakes are applied, the speed controlled valve device 2 will operate as the speed of the vehicle reduces to reduce the pressure in chamber 7 of the brake cylinder pressure control valve device 1a which in turn will operate to correspondingly reduce the pressure in the brake cylinder 6, in the manner hereinbefore described in connection with the equipment shown in Fig. 1, so that the brakes will be maintained applied with a pressure which corresponds to the vehicle speed as well as load.

In the modification shown in Fig. 7 of the drawings two brake cylinders 6 and 6a are employed to provide the braking of a vehicle obtained by the brake cylinder 6 in the construction shown in Fig. 6.

When an application of the brakes is effected with the equipment shown in Fig. 7, the pressure obtained in the brake cylinder 6 upon a reduction in brake pipe pressure is governed by the load controlled modifying valve device 71. According to the invention a pipe 68 is connected to pipe 67 through which fluid under pressure is supplied from the control valve device 1 to the brake cylinder 6. As a result, a portion of the fluid supplied to pipe 67 flows through pipe 68 and the speed controlled modifying valve device 2 to the brake cylinder 6a until a pressure is obtained in said brake cylinder which corresponds to the adjustment of said modifying valve device.

It will now be seen that when an application of the brakes is effected by the operation of the equipment shown in Fig. 7, the pressure obtained in brake cylinder 6 is modified according to the load on the vehicle, whereas that obtained in brake cylinder 6a is modified according to the speed of the vehicle, and since these two brake cylinders cooperate to apply the brakes on the vehicle, the vehicle is braked upon a reduction in brake pipe pressure in accordance with both load and speed.

As the speed of the vehicle reduces after the brakes are applied, the speed controlled modifying valve device 2 operates to reduce the pressure in brake cylinder 6a accordingly in the same manner as described in connection with the equipment shown in Fig. 1 of the drawings, thereby maintaining the pressure in brake cylinder 6a proportional to the speed of the vehicle, while the pressure in brake cylinder 6 remains proportional to the load on the vehicle, thus braking the vehicle in accordance with both speed and load.

In the equipments shown in Figs. 6 and 7 the modifying valve devices 2 and 71 may be interchanged, if desired, without effecting the result obtained by the operation of these equipments, or other modifying valve device or devices, such as the manually controlled modifying valve device 72, may be employed in these equipments instead of those shown, in order to provide any desired auxiliary control of the braking action obtained.

It will be noted that in the various equipments hereinbefore described, the pressure of fluid supplied by the modifying valve devices to the control valve devices is manually controlled so that the modifying pressure obtained in the control valve devices cannot exceed that intended by the operator.

It will further be noted that the manually controlled means employed for the purpose of illustration is the triple valve device 3 which is operative in accordance with variations in brake pipe pressure, but it is not intended that the scope of the invention be thus limited, as the pressure in pipe 16 might be otherwise controlled.

From the above description of operation it will be noted that improved means for controlling the brakes on a vehicle is provided which embodies a control valve device that enables an auxiliary control of the pressure obtained in the brake cylinder upon effecting an application of the brakes, the auxiliary control being obtained through the medium of a load controlled device, a speed controlled device or any other device whereby the desired modified action of the brakes may be obtained.

While several illustrative embodiments of the invention have been described in detail, it is not my intention to limit its scope to these embodiments or otherwise than by the terms of the appended claims.

Having now described my invention, what I claim as new and desire to secure by Letters Patent, is:

1. In a vehicle fluid pressure brake, in combination, a brake pipe, a brake cylinder, a valve device operated by fluid under pressure supplied thereto for supplying fluid under pressure to said brake cylinder at a pressure proportional to the pressure supplied thereto, a triple valve device operative upon reduction in brake pipe pressure for supplying fluid to said valve device at a pressure dependent upon the degree of reduction in brake pipe pressure, and means controlled by a variable operating condition of the vehicle for supplying fluid from said triple valve device to said valve device at a pressure which is varied in accordance with said variable operating condition for cooperating with the pressure of fluid supplied by said triple valve device to control the operation of said valve device.

2. In a vehicle fluid pressure brake, in combination, a brake cylinder, a valve device having two chambers and operated according to the degree of fluid pressure supplied to said chambers for controlling the supply of fluid under pressure to said brake cylinder, means operative upon effecting an application of the brakes for supplying fluid under pressure to one of said chambers, and means operative only upon effecting an application of the brakes to supply fluid to the other chamber at a pressure which varies according to a variable operating condition of the vehicle.

3. In a vehicle fluid pressure brake, in combination, a brake cylinder, a valve device having two chambers and operated according to the degree of fluid pressure supplied to said chambers for controlling the supply of fluid under pressure to said brake cylinder, valve means operative upon effecting an application of the brakes to supply fluid under pressure to one chamber, other means controlled by a variable operating condition of the vehicle and operative to supply fluid to the other chamber at a pressure which varies in accordance with said operating condition, the supply of fluid to said other means being controlled by said valve means.

4. In a vehicle fluid pressure brake, in combination, a brake cylinder, a valve device having two chambers and operated according to the degree of fluid pressure supplied to said chambers for controlling the supply of fluid under pressure to said brake cylinder, valve means operative upon effecting an application of the brakes to supply fluid under pressure to one chamber, other means controlled by a variable operating condition of the vehicle and operative to establish a communication through which a portion of the fluid supplied by said valve means is supplied to the other chamber, said other means being operative to cut off the supply of fluid under pressure to said other chamber when the pressure obtained therein corresponds to the operating condition of the vehicle.

5. In a vehicle fluid pressure brake, in combination, a brake cylinder, a valve device having two chambers and operated according to the degree of fluid pressure supplied to said chambers for controlling the supply of fluid under pressure to said brake cylinder, valve means operative upon effecting an application of the brakes to supply fluid under pressure to one chamber and to a communication through which fluid under pressure is adapted to be supplied to the other chamber, and means controlled by a variable operating condition of the vehicle for controlling said communication and operative to close said communication when the pressure obtained in said other chamber corresponds to the operating condition of the vehicle.

6. In a vehicle fluid pressure brake, in combination, a brake cylinder, a valve device operated by fluid under pressure supplied thereto for supplying fluid under pressure to said brake cylinder at a pressure proportional to the pressure supplied thereto, means controlled by the speed of the vehicle and operative to supply fluid to said valve device at a pressure which varies according to the vehicle speed and valve means operative in effecting an application of the brakes for supplying fluid under pressure to said valve device and to said means, the pressures supplied by said means and said valve means cooperating to control the operation of said valve device.

7. In a vehicle fluid pressure brake, in combination, a brake cylinder, a valve device comprising a plurality of movable abutments which cooperate to vary the pressure of fluid acting in said brake cylinder in accordance with the pressure of fluid acting on said abutments, valve means operative in effecting an application of the brakes for supplying fluid under pressure to act on said abutments, and means controlled by a variable operating condition of the vehicle for varying the pressure of fluid obtained on one of said abutments according to the operating condition.

8. In a vehicle fluid pressure brake, in combination, a brake cylinder, a valve device comprising a plurality of movable abutments which cooperate to vary the pressure of fluid acting in said brake cylinder in accordance with the pressure of fluid acting on said abutments, valve means operative in effecting an application of the brakes for supplying fluid under pressure to act on said abutments, and manually adjustable means for varying the pressure of fluid obtained on one of said abutments from said valve means.

9. In a vehicle fluid pressure brake, in combination, a brake cylinder, a valve device having two chambers and operated by the cooperative action of fluid pressures in said chambers for supplying fluid under pressure to said brake cylinder at a pressure proportional to the pressures in said chambers, valve means operative in effecting an application of the brakes for supplying fluid under pressure to both of said chambers, and means controlled by the speed of the vehicle for controlling the supply of fluid from said valve means to one of said chambers and operative to vary the pressure of fluid obtained in said one chamber in accordance with the speed.

10. In a vehicle fluid pressure brake, in combination, manually controlled means operative to supply fluid at different pressures, means controlled by the speed of the vehicle operative to supply fluid at a pressure which varies according to the speed, means controlled by the load on the vehicle operative to supply fluid at a pressure which varies according to the load, and valve means controlled by the pressures supplied by said manually controlled means, the speed controlled means and the load controlled means for applying the brakes on the vehicle to a degree which varies in accordance with the degree of said pressures.

11. In a vehicle fluid pressure brake, in combination, valve means operative by fluid under pressure to effect an application of the brakes on the vehicle, manually controlled means for supplying fluid at varying pressures to said valve means for effecting the operation thereof, means for supplying to said valve means fluid at pressures which vary according to a plurality of variable operating conditions of the vehicle for modifying the action on said valve means of the pressure supplied by said manually controlled means and for thereby varying the degree of brake application in accordance with the variable operating conditions, and means controlled by the variable operating conditions of the vehicle for controlling said means.

12. In a vehicle fluid pressure brake, in combination, manually controlled means operative to supply fluid at various desired pressures, means controlled by one variable operating condition of the vehicle for supplying fluid at a pressure depending upon said operating condition, means controlled by another variable operating condition of the vehicle for supplying fluid at a pressure depending upon such condition, and valve means controlled by the pressures supplied by each of said means for effecting an application of the brakes the degree of which is proportional to said pressures.

13. In a vehicle fluid pressure brake, in combination, manually controlled means operative to supply fluid at various desired pressures, means controlled by one variable operating condition of the vehicle for supplying fluid at a pressure depending upon said operating condition, means controlled by another variable operating condition of the vehicle for supplying fluid at a pressure depending upon such condition, and valve means controlled by the pressures of fluid supplied by the three means and operative thereby to apply the brakes with a force depending upon the pressure of fluid supplied by said manually controlled means as modified by the pressures of fluid supplied by the two means controlled by the variable operating conditions of the vehicle.

14. In a vehicle fluid pressure brake, in combination, manually controlled means operative to supply to a communication fluid at various desired pressures, means controlled by one variable operating condition of the vehicle for supplying fluid from said communication to another communication at a pressure depending upon said operating condition, means controlled by another variable operating condition of the vehicle for supplying fluid to a third communication at a pressure depending upon such operating condition, and valve means controlled by the cooperative action of pressures in the three communications to effect an application of the brakes proportional in degree to said pressures.

15. In a vehicle fluid pressure brake, in combination, valve means adapted to be operated by fluid under pressure for supplying fluid at a proportional pressure to effect an application of the brakes and operative to vary the brake applying pressure in accordance with the degree of operating pressure, manually controlled means operative to supply fluid under pressure for effecting the operation of said valve means, means controlled by one variable operating condition of the vehicle for supplying fluid at a pressure depending upon said condition for modifying the brake applying pressure called for by the pressure of fluid supplied by said manually controlled means, and means controlled by the speed of the vehicle for supplying fluid at a pressure dependent upon speed and for reducing the pressure of such fluid as the speed of the vehicle reduces, for further modifying the brake applying pressure called for by the pressure of fluid supplied by said manually controlled means, so that the degree of application of brakes is in proportion to the pressures obtained by the operation of said manually controlled means, said means controlled by one variable operating condition of the vehicle and said speed controlled means.

16. In a vehicle fluid pressure brake, in combination, a brake cylinder, means operative to supply fluid at a pressure which varies according to one variable operating condition of the vehicle, valve means controlled by the pressure of fluid supplied through a pipe and supplied by said means for supplying fluid at a proportional pressure to said brake cylinder, other means operative to supply fluid at a pressure which varies according to another variable operating condition of the vehicle, manually controlled means for supplying fluid under pressure, and valve means controlled by fluid at the pressures supplied by said other means and said manually controlled means for supplying fluid at a proportional pressure to said pipe.

17. In a vehicle fluid pressure brake, in combination, a brake cylinder, manually controlled means operative to supply fluid under pressure, means controlled by a variable operating condition of the vehicle for supplying fluid at a pressure which varies according to said condition, valve means controlled by the pressures of fluid supplied by said manually controlled means and the means controlled by the variable operating condition for supplying a proportional pressure to said brake cylinder, another brake cylinder, and means controlled by another variable operating condition of the vehicle and operative upon the operation of said manually controlled means for supplying fluid at a pressure depending upon such operating condition to said other brake cylinder.

18. In a fluid pressure brake for a vehicle, in combination, a brake cylinder, a brake controlling valve device operative to supply fluid under pressure to effect an application of the brakes, a mechanism operative to supply fluid under pressure according to a variable operating condition of the vehicle, and a regulating valve device operable according to the degree of fluid under pressure supplied by said brake controlling valve device and also according to the pressure of fluid supplied by said mechanism for controlling the supply of fluid under pressure to the brake cylinder, the source of fluid under pressure for said mechanism being the fluid under pressure supplied by said brake controlling valve device.

19. In a fluid pressure brake, in combination, brake cylinder means, valve means having two chambers to which fluid under pressure is adapted to be supplied to supply fluid under pressure to said brake cylinder means and from which fluid under pressure is adapted to be released for releasing fluid under pressure from said brake cylinder means, a pipe through which fluid under pressure is adapted to be supplied to and released from said chambers, and means controlled by a variable operating condition of the vehicle controlling communication from said pipe to one of said chambers and operative to close said communication when the pressure in said one chamber is in accordance with said operating condition and to open said communication upon the release of fluid under pressure from said pipe for releasing fluid under pressure from said one chamber to said pipe.

20. In a fluid pressure brake, in combination, brake cylinder means, valve means having two chambers to which fluid under pressure is adapted to be supplied to supply fluid under pressure to said brake cylinder means and from which fluid under pressure is adapted to be released for releasing fluid under pressure from said brake cylinder means, manually controlled means for supplying and releasing fluid under pressure to and from one of said chambers, means controlled by a variable operating condition of the vehicle operative upon the supply of fluid under pressure to said one chamber for supplying fluid to the other chamber at a pressure depending upon the operating condition and operative to release fluid under pressure from said other chamber upon the release of fluid under pressure from said one chamber by the operation of said manually controlled means.

RAOUL BORDE.